United States Patent
Kranabenter

(10) Patent No.: US 8,638,196 B2
(45) Date of Patent: Jan. 28, 2014

(54) ADAPTING COIL VOLTAGE OF A TAG TO FIELD STRENGTH

(75) Inventor: Helmut Kranabenter, Graz (AT)

(73) Assignee: NXP B.V., Eindhoven (NL)

( * ) Notice: Subject to any disclaimer, the term of this patent is extended or adjusted under 35 U.S.C. 154(b) by 1730 days.

(21) Appl. No.: 10/503,208

(22) PCT Filed: Jan. 23, 2003

(86) PCT No.: PCT/IB03/00177
§ 371 (c)(1),
(2), (4) Date: Jul. 30, 2004

(87) PCT Pub. No.: WO03/065302
PCT Pub. Date: Aug. 7, 2003

(65) Prior Publication Data
US 2005/0156710 A1   Jul. 21, 2005

(30) Foreign Application Priority Data
Feb. 1, 2002 (EP) .................................... 02100093

(51) Int. Cl.
*H04Q 5/22* (2006.01)

(52) U.S. Cl.
USPC ............ 340/10.34; 340/10.1; 340/10.42; 340/10.5

(58) Field of Classification Search
CPC ....................................................... G08B 13/14
USPC ............. 340/10.34, 10.1, 10.33, 10.4, 10.42, 340/572.1; 455/41, 343, 44.1; 235/492, 235/494, 487; 307/104
See application file for complete search history.

(56) References Cited

U.S. PATENT DOCUMENTS

| | | | |
|---|---|---|---|
| 5,175,418 A * | 12/1992 | Tanaka ........................... | 235/439 |
| 5,418,358 A | 5/1995 | Bruhnke et al. | |
| 5,874,725 A * | 2/1999 | Yamaguchi ..................... | 235/492 |
| 5,874,829 A | 2/1999 | Holweg et al. | |
| 6,011,488 A * | 1/2000 | Busser ........................ | 340/10.34 |
| 6,161,762 A * | 12/2000 | Bashan et al. ................. | 235/492 |
| 6,167,236 A | 12/2000 | Steinhagen et al. | |
| 6,301,138 B1 * | 10/2001 | Amtmann ...................... | 363/126 |
| 6,304,613 B1 | 10/2001 | Koller et al. | |
| 6,356,198 B1 * | 3/2002 | Wuidart et al. ............. | 340/572.5 |
| 6,356,738 B1 * | 3/2002 | Schneider et al. ........... | 455/41.2 |
| 6,427,065 B1 * | 7/2002 | Suga et al. .................... | 455/41.1 |
| 6,636,146 B1 * | 10/2003 | Wehoski ....................... | 340/10.4 |

(Continued)

FOREIGN PATENT DOCUMENTS

| EP | 0 398 943 B1 | 12/1995 |
|---|---|---|
| EP | 1 089 217 | 4/2001 |

(Continued)

OTHER PUBLICATIONS

International Search Report for Patent Appln. No. PCT/IB2003/00177 (May 15, 2003).

*Primary Examiner* — Nam V Nguyen

(57) ABSTRACT

In a data carrier (1) for contactless communication with a base station (2) across an electromagnetic field (HF) generated by the base station (2), coil voltage control means (16) are arranged for controlling the unmodulated coil voltage (US) of the received signal (ES), the coil voltage control means (16) being arranged for control in response to an essentially decreasing coil voltage (US) when the field strength of the electromagnetic field (HF) increases.

13 Claims, 2 Drawing Sheets

(56) References Cited

U.S. PATENT DOCUMENTS

| | | | |
|---|---|---|---|
| 6,685,096 B1 * | 2/2004 | Roz et al. | 235/492 |
| 6,705,441 B1 * | 3/2004 | Boys et al. | 191/10 |
| 6,778,070 B1 | 8/2004 | Thomas | |
| 6,859,640 B2 * | 2/2005 | Bardouillet et al. | 455/41.1 |
| 6,894,616 B1 * | 5/2005 | Forster | 340/572.1 |
| 7,049,936 B2 * | 5/2006 | Wuidart | 340/10.4 |

FOREIGN PATENT DOCUMENTS

| | | |
|---|---|---|
| JP | 10-044936 A | 2/1998 |
| JP | 2000-004189 A | 1/2000 |
| WO | 00/70552 A1 | 11/2000 |

* cited by examiner

ADAPTING COIL VOLTAGE OF A TAG TO FIELD STRENGTH

The invention relates to a data carrier for contactless communication with a base station across an electromagnetic field generated by the base station, having an antenna coil connected to a first coil terminal and to a second coil terminal into which a received signal can be induced when the electromagnetic field is in operation, which received signal has a coil voltage between the first and the second coil terminal, and having modulation means for modulating the electromagnetic field via transmission data to be communicated to the base station, the coil voltage of the received signal being occasionally reduced by a modulation amplitude and its load being modulated in that the resistance value of a modulation load connected at least indirectly to the first and the second coil terminal is changed occasionally.

The invention further relates to an integrated circuit of a data carrier for the contactless communication with a base station across an electromagnetic field generated by the base station, the integrated circuit having the following characteristic features:
a first coil terminal and a second coil terminal to which an antenna coil can be connected into which a received signal having a coil voltage between the first and second coil terminals can be induced during operation of the electromagnetic field;
modulation means for modulating the electromagnetic field via transmission data to be communicated to the base station, the coil voltage of the received signal being occasionally reduced by a modulation amplitude and its load being modulated in that the resistance value of a modulation load connected at least indirectly to the first and the second coil terminal is changed occasionally.

Such a data carrier and such an integrated circuit are known from the document U.S. Pat. No. 5,874,829 and formed by a transponder of a so-called smart card. The known transponder is in the form of an IC having a first and a second coil terminal to which the antenna coil is connected. The IC includes a voltage supply circuit with an energy storage capacitor and two parallel controllers to ensure a constant supply voltage for the elements of the IC. For this purpose the two parallel controllers are indirectly connected to the first and second coil terminals of the antenna coil and arranged for leaking a parallel current from the first coil terminal to the second coil terminal. The energy storage capacitor is indirectly connected to the first and second coil terminals via a rectifier circuit and arranged for storing the coil voltage rectified and controlled by the parallel controllers.

When the transponder is held close to the base station and thus the electromagnetic field has a relatively large field strength, the coil voltage and thus the supply voltage to the energy storage capacitor would strongly increase, which is undesired. To avoid this, the parallel controllers in that case leak a parallel current having a relatively large current strength, so that the coil voltage is controlled in response to a substantially steady voltage value.

The parallel controllers published in this document have different controller characteristics, the one parallel controller relatively rapidly reacting to variations in the coil voltage and the other parallel controller relatively slowly reacting to variations in the coil voltage. The two parallel controllers control the coil voltage in response to a substantially constant voltage value, so that a constant supply voltage is ensured both with fast and slow movements of the smart card in the electromagnetic field.

In the parallel controllers the excessive energy derived from the parallel current and received from the electromagnetic field via the antenna coil is to be leaked in the form of thermal loss. The thermal loss to be carried off comes from a multiplication of the current strength of the parallel current by the voltage value of the coil voltage. The loss thus increases all the more as the transponder is kept closer to the base station.

The known transponder further includes modulation means mentioned above with which a load modulation of an electromagnetic field is achieved by connecting and disconnecting the modulation load. The modulation amplitude is larger as the voltage value of the coil voltage is stronger.

With the known data carrier and the known integrated circuit there is the disadvantage that, because of the coil voltage being controlled in response to the substantially steady voltage value, a modulation amplitude in essence independent of the distance from the data carrier to the base station is the result. Since the inductive coupling of the antenna coils of the data carrier and of the base station across the electromagnetic field diminishes the more remote they are from each other, also the reliability of the transmission data transmitted during the load modulation diminishes when the distance increases.

It is an object of the invention to provide a data carrier of the type as defined in the introductory paragraph and an integrated circuit of the type as defined in the second paragraph, with which data carrier and integrated circuit the disadvantages mentioned above are avoided. To achieve the object defined above, coil voltage control means for controlling the unmodulated coil voltage of the received signal are provided with such a data carrier and such an integrated circuit, the coil voltage control means being arranged for control in response to the in essence decreasing coil voltage when the field strength of the electromagnetic field increases.

The characteristic features according to the invention achieve that the coil voltage control means control the coil voltage in response to a relatively small voltage value in case of a large electromagnetic field strength—thus in the vicinity of the base station. The modulation amplitude which is relatively small in this case is sufficient for the base station to reliably demodulate the transmission data transmitted from the data carrier across the electromagnetic field to the base station by means of load modulation, because the inductive coupling of the antenna coils is relatively large.

If, on the other hand, the electromagnetic field within range of the antenna coil of the data carrier is relatively small—the data carrier is thus relatively far from the base station—the coil voltage control means control the coil voltage in response to a relatively large voltage value. As a result, a relatively large modulation amplitude which makes it possible that despite the large distance between the data carrier and the base station and the thus small inductive coupling of its antenna coils the transmitted data in the base station can be reliably demodulated. The data carrier according to the invention thus provides an extremely large transmission range.

A further advantage of the invention is that the thermal loss to be carried off from the coil voltage control means is smaller than with known data carriers. This advantage is obtained because the coil voltage control means control in response to a lower voltage value of the coil voltage when the field strength of the electromagnetic field increases, thus in the vicinity of the base station. This is especially advantageous when the data carrier is arranged as an integrated circuit.

According to the measures stated in claim 2 an extremely advantageous control characteristic of the coil voltage control means is obtained.

In accordance with the measures stated in claims 3 and 4, an extremely advantageous arrangement of the coil voltage control means is obtained in practice.

In accordance with the measures stated in claim 5 the advantage is obtained that the reference voltage source controls the coil voltage in a proper voltage range and thus the supply with electric energy from the energy storage capacitor of the elements of the data carrier is guaranteed.

These and other aspects of the invention are apparent from and will be elucidated with reference to the embodiments described hereinafter.

Figure 1:
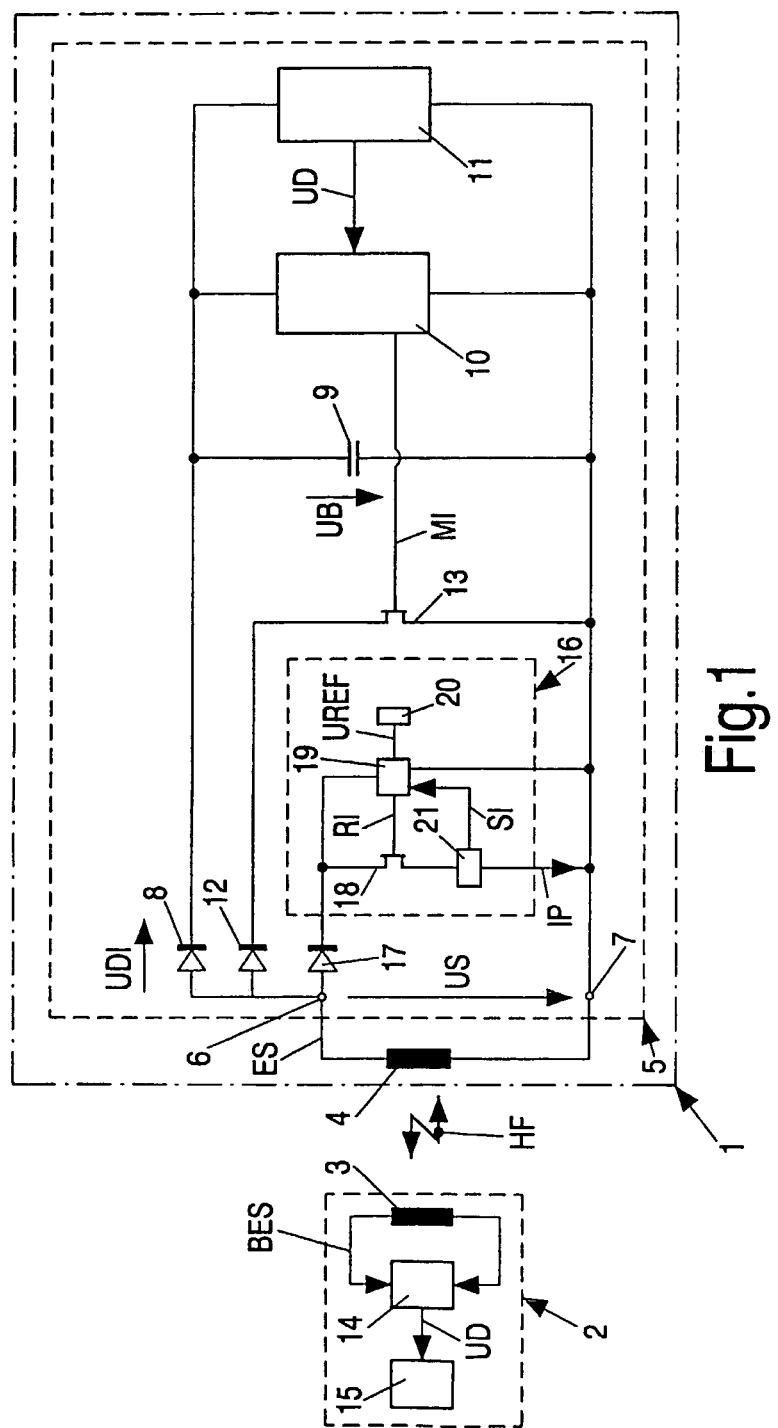
FIG. 1 shows a base station and a data carrier which communicate with each other across an electromagnetic field generated by the base station, the data carrier including coil voltage control means.

FIG. 1 shows a data carrier 1 which is arranged for contactless communication with a base station 2. To this end the base station 2 generates an electromagnetic field HF via an antenna coil 3 of the base station 2, as a result of which electromagnetic field HF an inductive coupling with an antenna coil 4 of the data carrier 1 is established. Energy for driving the elements of the data carrier 1 and data to be transmitted to the data carrier 1 can be conveyed across the electromagnetic field HF. Such systems have been known long since and communicate, for example, with a frequency of the electromagnetic field HF of 13.56 MHz or 125 kHz.

The data carrier 1 is formed by an integrated circuit 5 and the antenna coil 4, the antenna coil 4 being connected with its coil ends to a first coil terminal 6 and a second coil terminal 7 of the integrated circuit 5. If the data carrier 1 is inserted into the electromagnetic field HF, a received signal ES is then induced into the antenna coil 4 and a coil voltage US is developed. The developing voltage value of the coil voltage US then depends on the input resistance of the integrated circuit 5 on the first coil terminal 6 and the second coil terminal 7.

A first diode 8 which is linked with the second coil terminal 7 via an energy storage capacitor 9 and forms a first circuit branch is connected to the first coil terminal 6. The first diode 8 is arranged in MOS technology and forms a one-way rectifier by which the energy storage capacitor 9 is charged via the positive half waves of the received signal ES to an operating voltage UB. Since the forward voltage UDI of the first diode 8 is about 1.5 V, the energy storage capacitor 9 is charged to its maximum to the operating voltage UB equal to the voltage amplitude of the positive half waves of the coil voltage US minus the forward voltage UDI.

The integrated circuit 5 comprises processing means 10 and storage means 11 which are supplied with the operating voltage UB by the energy storage capacitor 9. The processing means 10 comprise a so-called microcontroller and are arranged for executing a software program stored in the energy storage means 11, which has been known long since in this context. To avoid damage to the processing means 10 and the energy storage means 11 the operating voltage UB must not exceed a maximum value of UBMAX, UBMAX being predefined by the dielectric strength of the processing means 10 and of the storage means 11. To ensure a reliable execution of the software program and more particularly reliable storage operations in the storage means 11, the operating voltage UB must not drop below the minimum value of UBMIN.

The integrated circuit 5 further includes modulation means constituted by a second diode 12, a first transistor 13 and the processing means 10. The modulation means are arranged for modulating the electromagnetic field HF with transmission data UD to be communicated to the base station 2, the coil voltage US occasionally being reduced and thus load-modulated as a result of an occasional modification of the resistance value of a modulation load formed by the first transistor 13 at least connected indirectly to the first coil terminal 6 and the second coil terminal 7.

The processing means 10 are arranged for reading transmission data UD stored in the energy storage means 11 and, as the case may be, for processing the transmission data UD read out. In a send mode of the data carrier 1 the processing means 10 are arranged for supplying modulation information MI which is characteristic of the transmission data UD to be transmitted to a data terminal of the first transistor 13. The modulation information MI is digital information and controls the first transistor 13 either to its conducting or its inhibiting state.

Figure 3:
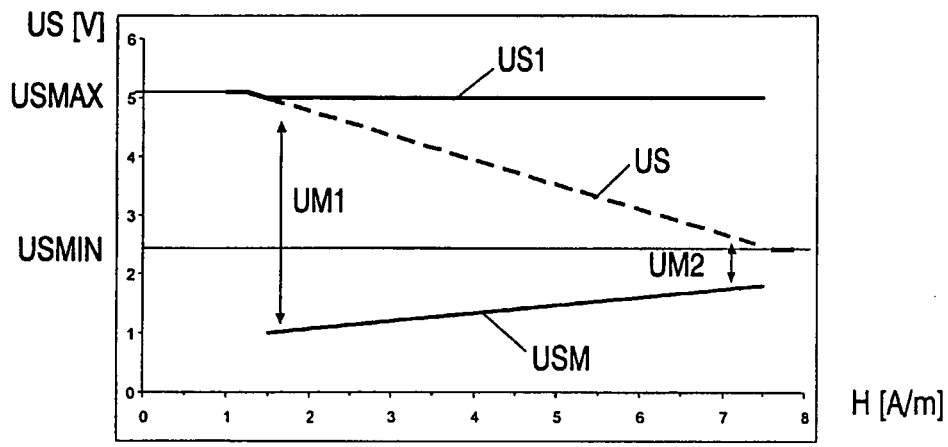
FIG. 3 shows the pattern of the coil voltage controlled by the coil voltage control means, which coil voltage monotonously diminishes with increasing field strength of the electromagnetic field.

The second diode 12 and the first transistor 13 form a second circuit branch connected to the first coil terminal 6 and the second coil terminal 7. If the first transistor 13 is cut off, the second circuit branch has a practically infinite resistance and influences the input resistance of the integrated circuit 5 and thus the coil voltage US on the first coil terminal 6 and the second coil terminal 7. If, on the other hand, the transistor 13 is turned on, the second circuit branch has a resistance of, for example, 200 Ohms and strongly influences the coil voltage US adapting to the first coil terminal 6 and the second coil terminal 7. In this case the coil voltage US is reduced by a modulation amplitude UM modulated on a coil voltage USM as this is shown in FIG. 3. This small coil voltage USM modulated on the antenna coil 4 influences the electromagnetic field HF so that a load modulation takes place.

The base station 2 comprises in addition to other elements not essential in this connection and therefore not shown in FIG. 1, demodulation means 14 to which the base station receive signal BES induced into the antenna coil 3 can be applied by the antenna coil 3. The demodulation means 14 are arranged for detecting the amplitude variations of the base station receive signal BES which variations are caused by the load modulation and for demodulating the transmission data UD transmitted from the data carrier 1 to the base station 2. The transmission data UD demodulated in the base station 2 can further be processed by processing means not shown in FIG. 1 and subsequently be stored in storage means 15.

The data carrier 1 now further comprises coil voltage control means 16 for controlling the unmodulated coil voltage US of the received signal ES, the coil voltage control means 16 being arranged for control in response to an in essence decreasing coil voltage US when the field strength of the electromagnetic field HF increases. A third diode 17 connected to the first coil terminal 6 is connected via the coil voltage control means 16 to the second coil terminal 7 and thus forms a third circuit branch.

Figure 2:
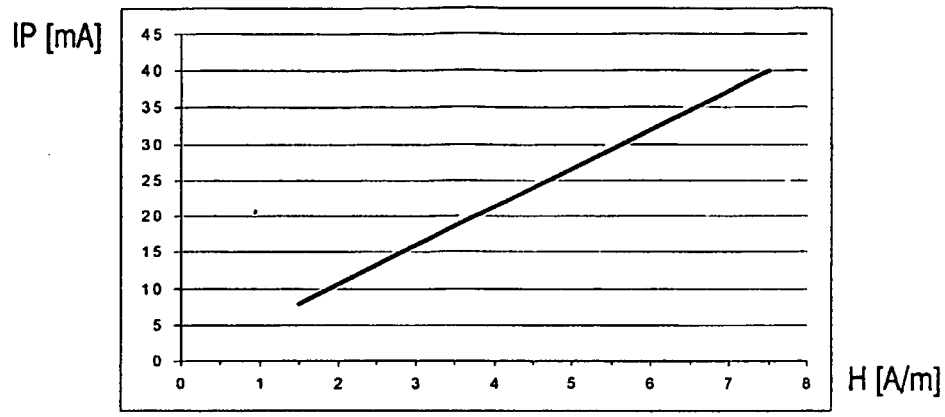
FIG. 2 shows the curve of a parallel current controlled by the coil voltage control means, which current monotonously increases with increasing field strength of the electromagnetic field.

The operation of the coil voltage control means 16 will now be further explained with reference to the characteristic curves shown in FIGS. 2 to 4. In FIG. 2 is shown the curve of a parallel current IP flowing through the third circuit branch when the field strength of the electromagnetic field HF increases. Seen from the data carrier 1 the field strength of the electromagnetic field HF increases the closer the data carrier 1 is brought to the base station. The closer the data carrier 1 is kept to the base station 2, the stronger will also be the inductive coupling of the two antenna coils 3 and 4. With increasing field strength of the electromagnetic field HF the coil voltage control means 16 reduce the resistance of the third circuit branch and thus the input resistance on the coil terminals 6 and 7 to adjust the coil voltage US in accordance with the characteristic curve in FIG. 3, while the current strength of the parallel current IP increases—as is shown in FIG. 2.

In FIG. 3 is shown the curve of the coil voltage US controlled by the coil voltage control means 16 plotted against a coil voltage US1 which is controlled by state-of-the-art coil voltage control means. Known coil voltage control means control in response to an essentially constant coil voltage US1 when the field strength of the electromagnetic field changes, to guarantee the constant operating voltage UB.

The coil voltage control means 16, on the other hand, control in response to an in essence decreasing coil voltage US. This achieves that when the data carrier 1 is in the vicinity of the base station 2 and the field strength of the electromagnetic field HF is large, the coil voltage is controlled relatively small. Since the inductive coupling of the antenna coils 3 and 4 in this case is relatively good, it is also possible with a relatively low modulation amplitude UM@ to transmit transmission data UD from the data carrier 1 to the base station 2 and reliably demodulate them in the base station 2.

Figure 4:
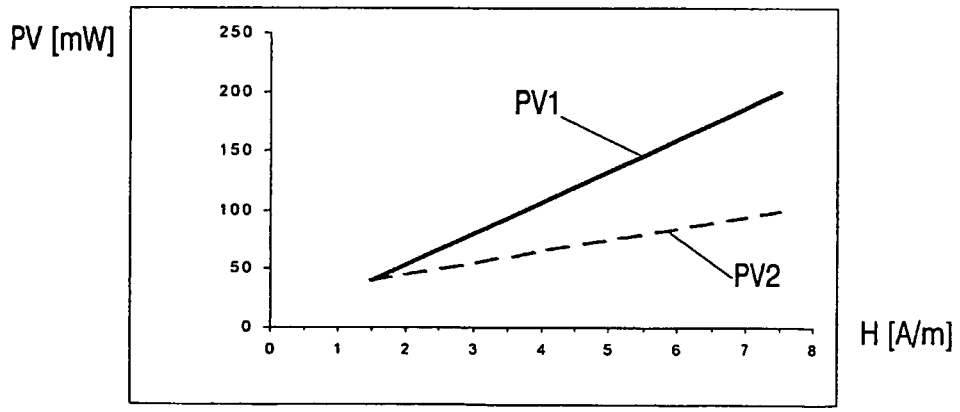
FIG. 4 shows the pattern of the thermal loss to be carried off in the coil voltage control means when the field strength of the electromagnetic field increases.

As is shown in FIG. 4, in the case where the data carrier 1 is found in the vicinity of the base station 2, the advantage is obtained that the dissipated power PV2 occurring in the coil voltage control means 16 is considerably smaller than the dissipated power PV1 occurring in the state-of-the-art coil voltage control means. This dissipated power can also be calculated from the product of the coil voltage US (US1>US) and the parallel current IP. As a result, the base station 2 communicating with data carriers 1 can generate the electromagnetic field HF with considerably larger field strength without it being feared that the data carrier 1 brought to the vicinity of the base station 2 is thermally disturbed. This larger field strength of the electromagnetic field HF can enable the data carrier 1 to communicate over an essentially larger distance with the base station 2, which is highly advantageous.

When the data carrier 1 according to the invention is inserted into the electromagnetic field HF of the base station at a relatively large distance from the base station 2, the coil voltage control means 16 according to the invention control the coil voltage US in response to a relatively large voltage value as this is shown in FIG. 3. This achieves that in this case a relatively large modulation amplitude UM1 is reached during the load modulation and thus transmission data UD transmitted from the data carrier 1 to the base station 2 can be reliably demodulated in the base station 2, despite the relatively poor inductive coupling in this case of the antenna coils 3 and 4.

The coil voltage control means 16 comprise a second transistor 18, a control stage 19, a reference voltage source 20 and a parallel current sensor 21. The parallel current sensor 21 is arranged for monitoring the parallel current IP derived by the coil voltage control means 16 and for delivering respective sensor information SI to the control stage 19. The control stage 19 is further supplied with the reference voltage UREF by the reference voltage source 20 to be able to control the coil voltage US independent of the operating temperature or ambient temperature of the data carrier 1. Such a reference voltage source 20 is known to the expert, for example, as a so-called bandgap source as a result of which this will not be further discussed here.

The control means 19 are dependent on the sensor information SI featuring the current strength of the parallel current IP and "calibrated" by the reference voltage UREF so as to deliver control information RI to a gate terminal of the second transistor 18. Depending on the control information RI, the second transistor 18 changes its resistance and in doing so changes the resistance of the third circuit branch so that the input resistance of the integrated circuit 5 is changed at the first coil terminal 6 and the second coil terminal 7. The input resistance changed by the control information RI provides that the coil voltage US shown in FIG. 3 as a decreasing coil voltage is maintained when the field strength of the electromagnetic field HF increases. A monotonously decreasing coil voltage US with a monotonously increasing field strength of the electromagnetic field HF is highly advantageous in practice.

The control stage 19 is now further arranged for limiting the coil voltage US to a maximum coil voltage USMAX, to limit the operating voltage UB produced by the storage capacitor 9 to the maximum operating voltage UBMAX. This achieves the advantage that damage to the processing means 10 and the storage means 11 as a result of an overvoltage is avoided.

The control stage 19 is now further arranged for limiting the coil voltage US to a minimum coil voltage USMIN until a reliable processing of transmitted data UD by the processing means 10 and the storage means 11 is still guaranteed. This offers the advantage that when the data carrier 1 is relatively close to the base station 2, the relatively small coil voltage USMIN is still sufficient for guaranteeing the minimum operating voltage UBMIN.

It may be observed that coil voltage control means according to the invention—and as shown in FIG. 1—can be deposited on the so-called DC side after the rectifier diodes. It is also advantageous, however, to insert coil voltage control means according to the invention between the coil terminals and the rectifier diodes on the so-called AC side. The same advantages as described above will then be obtained.

It may be observed that the coil voltage control means according to the invention can also be connected to a two-way rectifier or to a one-way rectifier which delivers only the negative half waves of the received signal to the coil voltage control means. Furthermore, the arrangement with three parallel circuit branches is not necessary. In this connection a man of skill in the art knows a multitude of possible arrangements.

Furthermore, it may be observed that the man of skill in the art knows a multitude of other possibilities of constructing coil voltage control means, to control according to the invention in response to a decreasing coil voltage US when the field strength of the electromagnetic field HF increases.

The invention claimed is:

1. A data carrier for contactless communication with a base station across an electromagnetic field generated by the base station, comprising
an antenna coil connected to a first coil terminal and to a second coil terminal into which a received signal can be induced when the electromagnetic field is in operation, the received signal having an unmodulated coil voltage between the first and the second coil terminal,
a modulation circuit for modulating the electromagnetic field with transmission data to be communicated to the base station by occasionally reducing the unmodulated coil voltage by a modulation amplitude as a result of a modification of the resistance value of a modulation load connected at least indirectly to the first and the second coil terminal, and a coil voltage control circuit arranged for controlling the unmodulated coil voltage in response to the strength of the electromagnetic field, by decreasing the unmodulated coil voltage in response to an increase in strength of the electromagnetic field, thereby decreasing the modulation amplitude.

2. A data carrier as claimed in claim 1, in which the coil voltage control circuit is arranged to produce a monotonously decreasing unmodulated coil voltage when the field strength of the electromagnetic field increases monotonously.

3. A data carrier as claimed in claim 1, in which the coil voltage control circuit is connected at least indirectly to the first and second coil terminals and are arranged for controlling a parallel current derived from the first coil terminal to the second terminal, the coil voltage control circuit being arranged for control in response to an in essence increasing current strength of the parallel current when the field strength of the electromagnetic field increases.

4. A data carrier as claimed in claim 3, in which the coil voltage control circuit includes a parallel-current sensor for monitoring the current strength of the parallel current and in which the coil voltage control circuit is arranged for control in response to a decreasing unmodulated coil voltage when the current strength of the parallel current increases.

5. A data carrier as claimed in claim 1, in which the coil voltage control circuit includes a reference voltage source to control the unmodulated coil voltage independently of the operating temperature of the data carrier in a voltage range between a maximum and a minimum coil voltage.

6. A data carrier as claimed in claim 1, wherein the coil voltage control circuit is further arranged for controlling the unmodulated coil voltage in response to the strength of the electromagnetic field, by, increasing the unmodulated coil voltage in response to a decrease in strength of the electromagnetic field, thereby increasing the modulation amplitude.

7. An integrated circuit of a data carrier for contactless communication with a base station across an electromagnetic field generated by the base station, comprising:

an antenna coil that produces an unmodulated coil voltage in response to the electromagnetic field;

a modulation circuit for modulating the unmodulated coil voltage to convey transmission data to the base station;

a coil voltage control circuit for reducing the unmodulated coil voltage in response to a parallel-current sensor detecting an increase in the electromagnetic field by sensing a current parallel to the antenna coil.

8. An integrated circuit as claimed in claim 7, in which the coil voltage control circuit is arranged to produce a monotonously decreasing unmodulated coil voltage when the field strength of the electromagnetic field increases monotonously.

9. An integrated circuit as claimed in claim 7, in which the coil voltage control circuit is connected at least indirectly to first and second coil terminals of the antenna coil and are arranged for controlling a parallel current derived from the first coil terminal to the second terminal, the coil voltage control circuit being arranged for control in response to an in essence increasing current strength of the parallel current when the field strength of the electromagnetic field increases.

10. An integrated circuit as claimed in claim 9, in which the parallel-current sensor is arranged for monitoring the current strength of the parallel current and in which the coil voltage control circuit is arranged for control in response to a decreasing unmodulated coil voltage when the current strength of the parallel current increases.

11. An integrated circuit as claimed in claim 7, in which the coil voltage control circuit includes a reference voltage source to control the unmodulated coil voltage independently of the operating temperature of the data carrier in a voltage range between a maximum and a minimum coil voltage.

12. An integrated circuit as claimed in claim 7, wherein the coil voltage control circuit is configured to increase the unmodulated coil voltage in response to a parallel-current sensor detecting a decrease in the electromagnetic field by sensing a current parallel to the antenna coil.

13. A data carrier circuit for contactless communication with a base station across an electromagnetic field generated by the base station, the circuit comprising an antenna coil connected to a first coil terminal and to a second coil terminal into which a received signal can be induced when the electromagnetic field is in operation, the received signal having an unmodulated coil voltage between the first and the second coil terminal;

a modulation circuit configured to modulate the electromagnetic field with transmission data to be communicated to the base station by controlling a resistance value of a modulation load connected to the first and the second coil terminal to control the coil voltage via a modulation amplitude; and a coil voltage control circuit configured to control the unmodulated coil voltage in response to the strength of the electromagnetic field, by decreasing the unmodulated coil voltage in response to an increase in strength of the electromagnetic field, and increasing the unmodulated coil voltage in response to a decrease in strength of the electromagnetic field.

\* \* \* \* \*